T. A. BROWN.
HOSE COUPLING.
APPLICATION FILED OCT. 4, 1913.
1,130,473.
Patented Mar. 2, 1915.
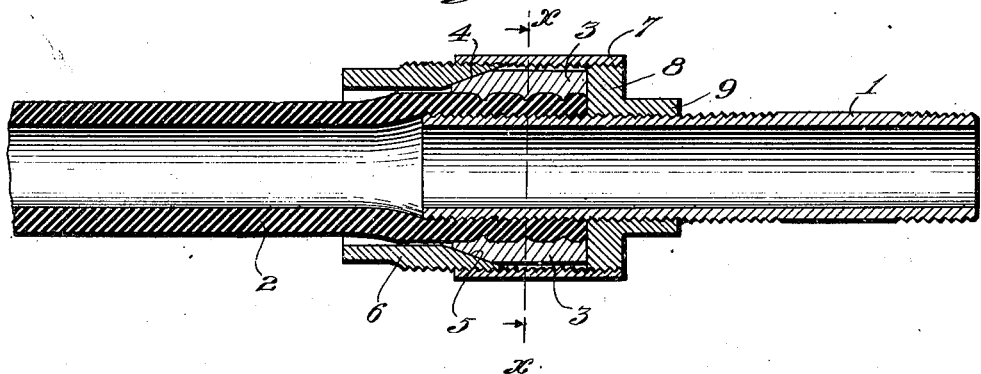
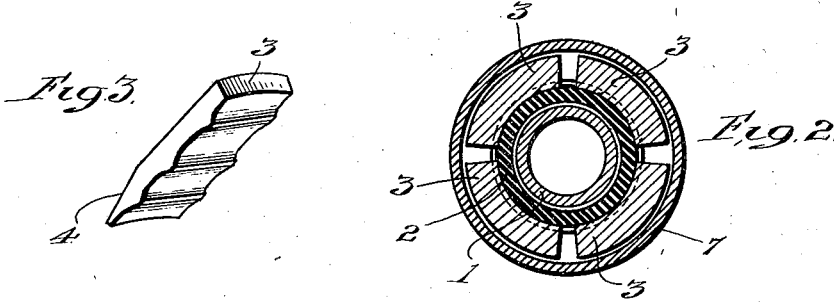
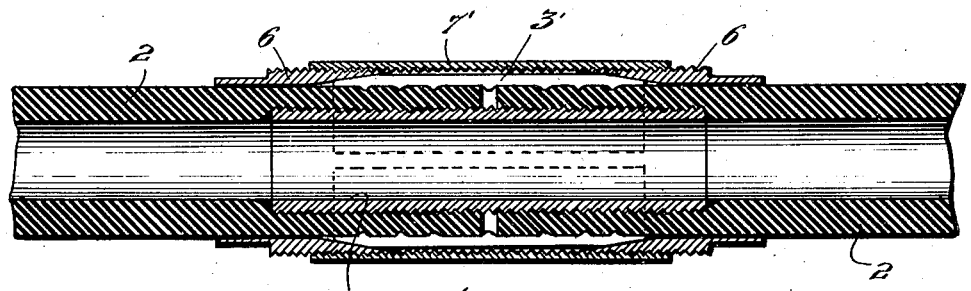
Witnesses:
H. J. Bull.
A. A. Olson.
Inventor.
Thomas A. Brown.
By Joshua R. H. Potts
His Attorney.

UNITED STATES PATENT OFFICE.

THOMAS A. BROWN, OF CHICAGO, ILLINOIS, ASSIGNOR OF ONE-HALF TO ALBERT MOHR, OF SOUTH CHICAGO, ILLINOIS.

HOSE-COUPLING.

1,130,473.  Specification of Letters Patent.  Patented Mar. 2, 1915.

Application filed October 4, 1913. Serial No. 793,307.

*To all whom it may concern:*

Be it known that I, THOMAS A. BROWN, a citizen of the United States, and a resident of the city of Chicago, county of Cook, and State of Illinois, have invented certain new and useful Improvements in Hose-Couplings, of which the following is a specification.

My invention relates to improvements in hose couplings and has for its object the production of a coupling which will be durable and economical in construction and through the medium of which two ends of hose may be readily and quickly coupled or through the medium of which the end of a hose may be as readily and quickly connected with the tool in conjunction with which the same is used.

A further object is the production of a coupling which, when in use, will be adapted to maintain an absolutely tight connection against any pressure and which will be generally very effective in use.

Other objects will appear hereinafter.

The invention consists in the combinations and arrangements of parts hereinafter described and claimed.

The invention will be best understood by reference to the accompanying drawing forming a part of this specification, and in which—

Figure 1 is a central longitudinal section of a coupling embodying my invention, Fig. 2 is a cross section taken on line $x-x$ of Fig. 1, Fig. 3 is a perspective view of one of the gripping members of the coupling detached, and Fig. 4 is a section similar to Fig. 1 illustrating my coupling employed in connecting the ends of two hose sections.

The preferred form of construction as illustrated in the drawing comprises a nipple 1 the opposite ends of which are externally screw threaded, said member 1 being in reality simply a section of pipe or tubing. In using the coupling to connect a hose with a tool the right hand end of the nipple 1 is connected with the tool. Over the opposite end of said nipple is fitted the end of the hose 2 which it is desired to couple as clearly shown. Loosely arranged around said hose end over the nipple 1 is a plurality of substantially rectangular segmental gripping members 3 the inner surfaces of which are corrugated or beaded as shown in order to effectually grip the outer surface of the hose about which the same are arranged. The outer surfaces of corresponding ends of the members 3 are beveled at 4 for engagement with a beveled surface 5 provided at the inner side of a sleeve 6 which is adapted to surround said gripping members as clearly shown, the arrangement being such that said gripping members may be moved into gripping relation with the hose or released therefrom by simply moving said sleeve longitudinally.

The sleeve 6 is held in positions of longitudinal adjustment or in operative positions by means of an internally operative sleeve 7 one end of which is in threaded connection with sleeve 6, the opposite end of said sleeve 7 being in threaded connection with a flange 8 which is threaded upon nipple 1 as shown.

With the arrangement disclosed it will be seen that in coupling a hose end with a tool, it is only required to fit one end of the nipple 1 into the end of the hose. This being done the gripping members 3 are arranged about the hose end and the sleeve 6 slid into engagement therewith to hold said gripping members in position. Said sleeve 6 is then threaded into the sleeve 7 to force the members 3 into secure engagement with the hose, the latter in turn being forced by the pressure of members 3 into the spaces between the threads of nipple 1 as clearly shown in Fig. 1 of the drawings. The flange 8 is preferably provided with an extension 9 and the outer surface of the outer end portion of the sleeve 6 is left plain and smooth in order to permit of the use of a wrench such as the Stillson wrench for rotating the flange 8 or said sleeve 6.

A coupling of the construction set forth is extremely simple and economical and may be manufactured at a low cost and will be found very effective in use.

In Fig. 4 is shown a form of coupling which is used in connecting the ends of two hose sections. In this form the ends of the hose which it is desired to connect are arranged over the respective ends of the nipple 1. Two sleeves 6 are employed which engage over the opposite beveled ends of the gripping members 3', the latter being of a length equal substantially to twice the length of the members 3, each end of each of the members 3' being of the same construction as the members 3 as will be readily understood. The flange 8 in this form is dispensed with, the sleeve 7' being made long enough to engage with the inner ends of both sleeves 6 which are employed in this construction. Each serves as a wrench receiving flange for the other.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a hose, of a nipple adapted to enter said hose; a plurality of beveled gripping members arranged about the hose; a threaded wrench receiving member; an internally threaded sleeve threaded on said wrench receiving member; and an internally beveled sleeve coöperating with the beveled portions of the gripping members and having exterior threads opposite the beveled portions coöperating with the internal threads of said sleeve, substantially as described.

2. The combination with a hose, of a threaded nipple extending thereinto; a plurality of beveled gripping members arranged about the hose; a threaded wrench receiving flange threaded onto the nipple; an internally threaded sleeve threaded on said wrench receiving member; and an internally beveled sleeve coöperating with the beveled portions of the gripping members and having exterior threads opposite the beveled portions coöperating with the internal threads of said sleeve, substantially as described.

In testimony whereof I have signed my name to this specification in the presence of two subscribing witnesses.

THOMAS A. BROWN.

Witnesses:
JOSHUA R. H. POTTS,
HELEN F. LILLIS.